UNITED STATES PATENT OFFICE.

MARK S. FOOTE AND GREENBURY R. HENRY, OF BURLINGTON, IOWA.

IMPROVEMENT IN CONVERTING IRON INTO STEEL.

Specification forming part of Letters Patent No. 159,402, dated February 2, 1875; application filed November 7, 1874.

*To all whom it may concern:*

Be it known that we, MARK S. FOOTE and GREENBURY R. HENRY, of Burlington, in the county of Des Moines and State of Iowa, have invented certain new and useful Improvements in the Making and Working of Steel and Iron; and we do hereby declare the following to be a full, clear, and exact description of the invention, such as will enable others skilled in the art to which it pertains to make and use it, reference being had to the accompanying drawings, which form part of this specification.

Our invention relates to a new improvement in the making and working of steel and iron, and more particularly to a new process of renewing old iron or combining cast and wrought iron, so as to produce steel, and of case-hardening or converting into steel any cast or wrought iron or cast-steel by immersion in a bath of melted metal, produced by melting cast-iron with the flux produced by the process described in Letters Patent No. 148,556, to Mark S. Foote, dated March 17, 1874.

We will now describe the process: The process of renewing old iron is to melt, in a cupola or other furnace, any old stove-plate, grate-bar, &c., with about twenty per centum of the flux above mentioned, said flux made by heat alone, and composed of iron ore, coke, limestone, and fire-clay or broken crockery. The product, when cool, will be a clear cast-iron, capable of being used and worked as any other iron. The process of converting scrap-steel into material which can be used is simply to melt it with the flux added in the proportion of one to ten. The product of this flux, melted with cast-iron in the proportion of about two to ten, is a hard white metal, which, when melted, forms a solution in which, if wrought-iron or cast-iron be immersed for variable periods of time, from ten minutes to two hours, according to the thickness of the iron, it will be covered with a hard coating, which extends into the iron, and permeates small pieces of it—in fact, converts the outer surface into steel, so that chisels for cutting wood or iron may be made with a fine and durable edge; and axes, hatchets, and other edged tools can be made of iron, and, by immersion in this bath, are converted into tools with steel edges; or the tread of a railroad-bar can thus be converted into steel, while the flange remains iron; or the rail can be made by immersing the upper portion of the fagot, that is afterward drawn out into the rail before making the rail, and thus making the tread of steel and the body of iron; or, by immersing the whole of the fagot in the solution before rolling it out into a bar, the whole will be of steel. Scraps of steel melted with this flux produce a clear steel of uniform texture.

What we claim as new, and desire to secure by Letters Patent, is—

The within-described solution or bath, composed of the above-named flux, made by heat alone, and composed of iron ore, coke, limestone, and fire-clay or broken crockery, wrought-iron, cast-iron, and scrap-steel, in the proportions substantially as described, and for the purposes specified.

In testimony that we claim the foregoing we have hereunto set our hands this 13th day of October, 1873.

MARK S. FOOTE.
    GREENBURY R. HENRY.

Witnesses:
 J. C. ALLEN,
 THOS. R. ACRES.